United States Patent
Greenfield et al.

(10) Patent No.: US 10,452,070 B2
(45) Date of Patent: Oct. 22, 2019

(54) CONTEXT-SPECIFIC TOLERANCE FOR MOTION CONTROL IN AUTONOMOUS VEHICLES

(71) Applicant: Uber Technologies, Inc., San Francisco, CA (US)

(72) Inventors: Aaron L. Greenfield, Pittsburgh, PA (US); Frederic Tschanz, Pittsburgh, PA (US); David McAllister Bradley, Pittsburgh, PA (US); Diana Yanakiev, Birmingham, MI (US)

(73) Assignee: Uber Technologies, Inc., San Francisco, CA (US)

( * ) Notice: Subject to any disclaimer, the term of this patent is extended or adjusted under 35 U.S.C. 154(b) by 174 days.

(21) Appl. No.: 15/705,507

(22) Filed: Sep. 15, 2017

(65) Prior Publication Data

US 2019/0086924 A1    Mar. 21, 2019

(51) Int. Cl.

| G01C 22/00 | (2006.01) |
|---|---|
| G05D 1/02 | (2006.01) |
| G01C 21/26 | (2006.01) |
| G05D 1/00 | (2006.01) |
| B60W 30/00 | (2006.01) |

(52) U.S. Cl.
CPC ........... *G05D 1/0212* (2013.01); *B60W 30/00* (2013.01); *G01C 21/26* (2013.01); *G05D 1/0088* (2013.01); *G05D 1/0214* (2013.01); *G05D 2201/0213* (2013.01)

(58) Field of Classification Search
CPC .............................. G05D 1/0212; B60W 30/00
See application file for complete search history.

(56) References Cited

U.S. PATENT DOCUMENTS

| 7,450,127 B2 * | 11/2008 | Hong ................ G05B 19/41 318/569 |
|---|---|---|
| 8,947,531 B2 * | 2/2015 | Fischer ................ G01S 7/003 348/148 |
| 2010/0228419 A1 | 9/2010 | Jin-Woo et al. | |

FOREIGN PATENT DOCUMENTS

| CA | 2957380 | 4/2017 |
|---|---|---|
| DE | 102014018192 | 6/2015 |
| WO | WO 2013159171 | 10/2013 |

OTHER PUBLICATIONS

PCT International Search Report and Written Opinion for PCT/US2018/050462, dated Dec. 7, 2018, 10 pages.

* cited by examiner

*Primary Examiner* — Adam M Alharbi
(74) *Attorney, Agent, or Firm* — Dority & Manning, P.A.

(57) ABSTRACT

The present disclosure provides systems and methods that employ tolerance values defining a level of vehicle control precision for motion control of an autonomous vehicle. More particularly, a vehicle controller can obtain a trajectory that describes a proposed motion path for the autonomous vehicle. A constraint set of one or more tolerance values (e.g., a longitudinal tolerance value and/or lateral tolerance value) defining a level of vehicle control precision can be determined or otherwise obtained. Motion of the autonomous vehicle can be controlled to follow the trajectory within the one or more tolerance values (e.g., longitudinal tolerance value(s) and/or a lateral tolerance value(s)) identified by the constraint set. By creating a motion control framework for autonomous vehicles that includes an adjustable constraint set of tolerance values, autonomous vehicles can more effectively implement different precision requirements for different driving situations.

20 Claims, 8 Drawing Sheets

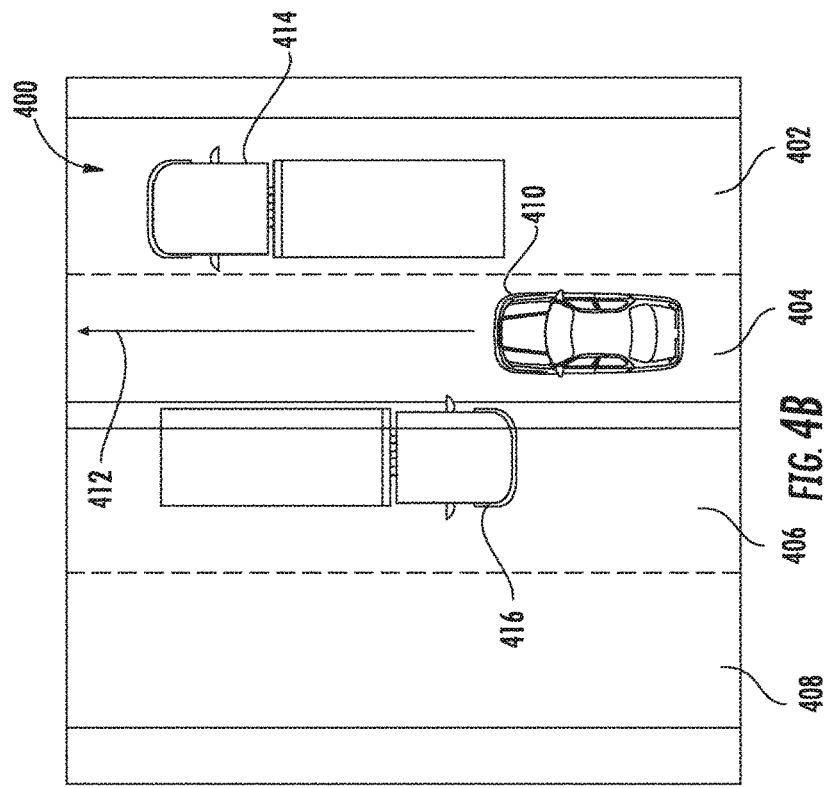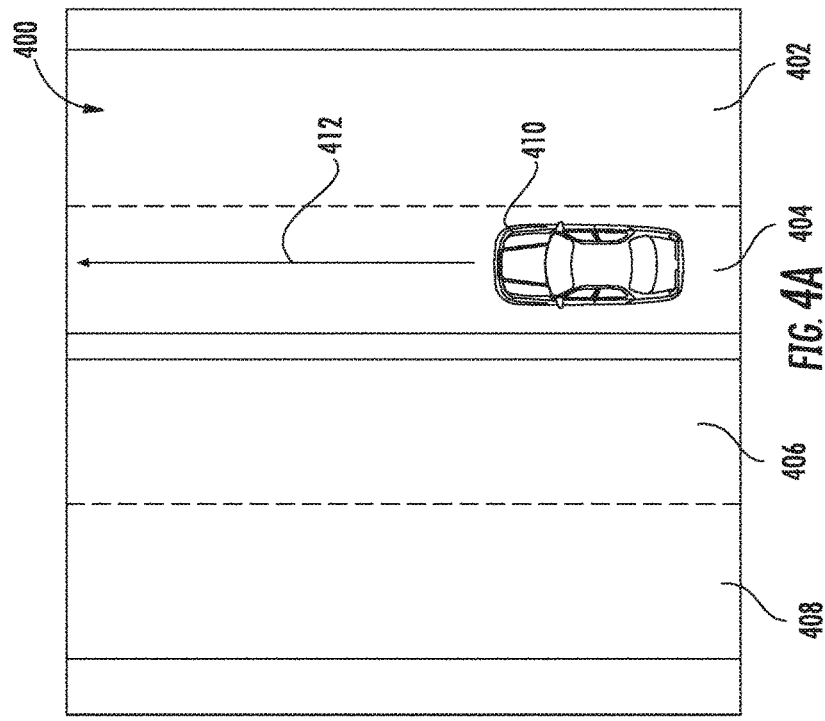

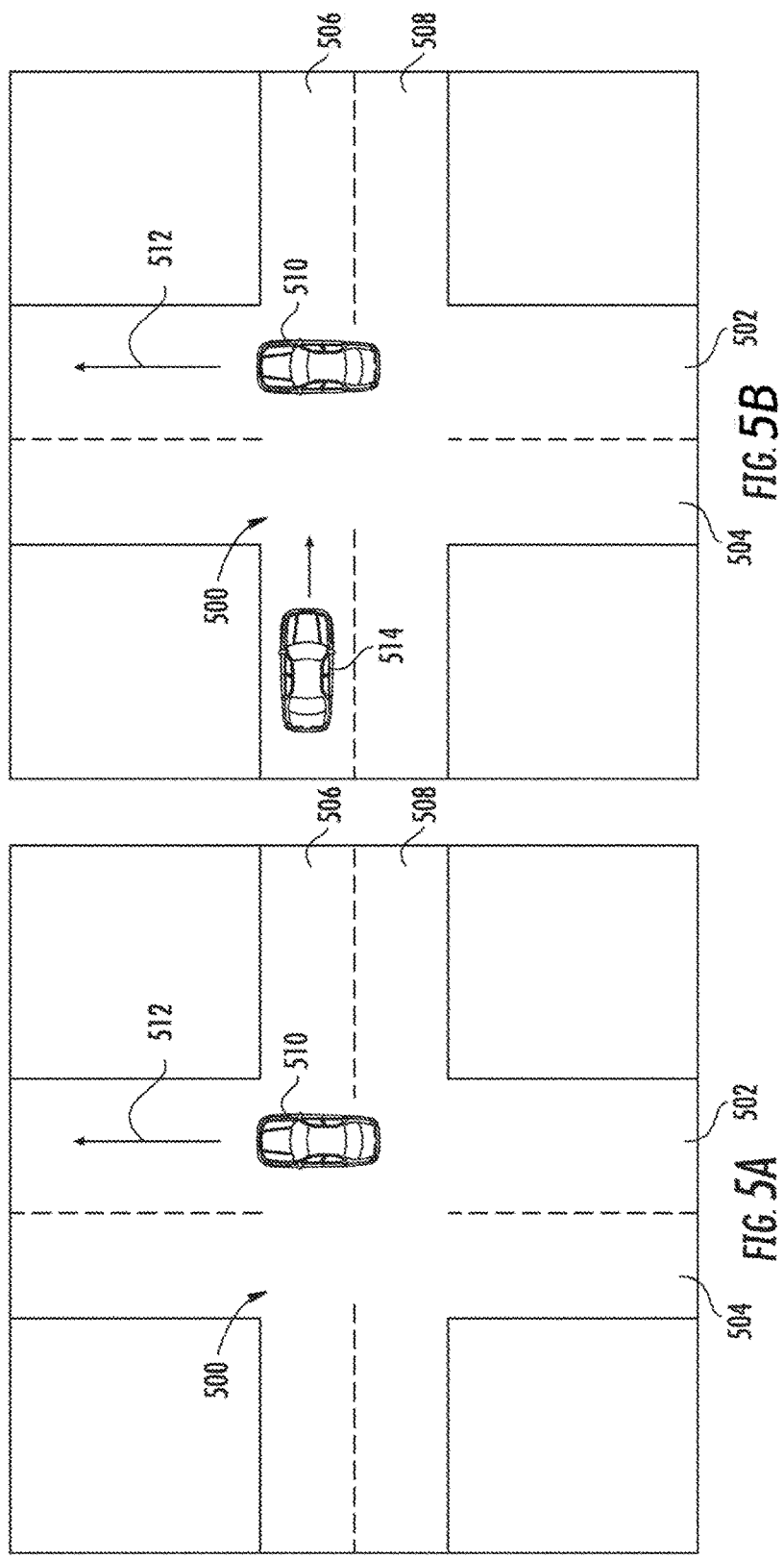

CONTEXT-SPECIFIC TOLERANCE FOR MOTION CONTROL IN AUTONOMOUS VEHICLES

FIELD

The present disclosure relates generally to autonomous vehicles. More particularly, the present disclosure relates to systems and methods that employ tolerance values defining a level of vehicle control precision for motion control of an autonomous vehicle.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a vehicle controller comprising circuitry. The circuitry is configured to obtain a trajectory that describes a proposed motion path for an autonomous vehicle. The circuitry is further configured to obtain one or more tolerance values defining a level of permitted deviation for the autonomous vehicle with respect to the trajectory. The one or more tolerance values are determined based on a current context associated with operation of the autonomous vehicle. The circuitry is further configured to generate one or more vehicle actuator commands based at least in part on the tolerance values. The one or more vehicle actuator commands are configured to control motion of the autonomous vehicle to follow the trajectory within the one or more tolerance values.

Another example aspect of the present disclosure is directed to an autonomous vehicle including a computing system, a vehicle controller, and one or more actuators. The computing system includes one or more computing devices. The vehicle controller is implemented by the computing system and is configured to obtain a trajectory that describes a proposed motion path for the autonomous vehicle and a constraint set of one or more tolerance values defining a level of vehicle control precision. The vehicle controller is further configured to generate a longitudinal actuator command and a lateral actuator command based at least in part on the constraint set of one or more tolerance values. The one or more actuators are configured to receive the longitudinal actuator command and the lateral actuator command and control motion of the autonomous vehicle to follow the trajectory in accordance with the level of vehicle control precision defined by the constraint set of one or more tolerance values.

Another example aspect of the present disclosure is directed to a computer-implemented method to control motion of an autonomous vehicle. The method includes obtaining, by a computing system comprising one or more computing devices, a trajectory that describes a proposed motion path for the autonomous vehicle. The method also includes obtaining, by the computing system, a constraint set of one or more tolerance values defining a level of vehicle control precision. The method also includes generating, by the computing system, one or more vehicle actuator commands based at least in part on the one or more tolerance values of the constraint set. The method also includes controlling motion of the autonomous vehicle in accordance with the one or more vehicle actuator commands such that the autonomous vehicle follows the trajectory within the one or more tolerance values identified by the constraint set.

Other aspects of the present disclosure are directed to various systems, apparatuses (e.g., vehicles, vehicle controllers, computing systems), non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 4A and 4B depict a first example aspect of a current context associated with operation of an autonomous vehicle according to example embodiments of the present disclosure;

FIGS. 5A and 5B depict a second example aspect of a current context associated with operation of an autonomous vehicle according to example embodiments of the present disclosure;

DETAILED DESCRIPTION

Figure 1:
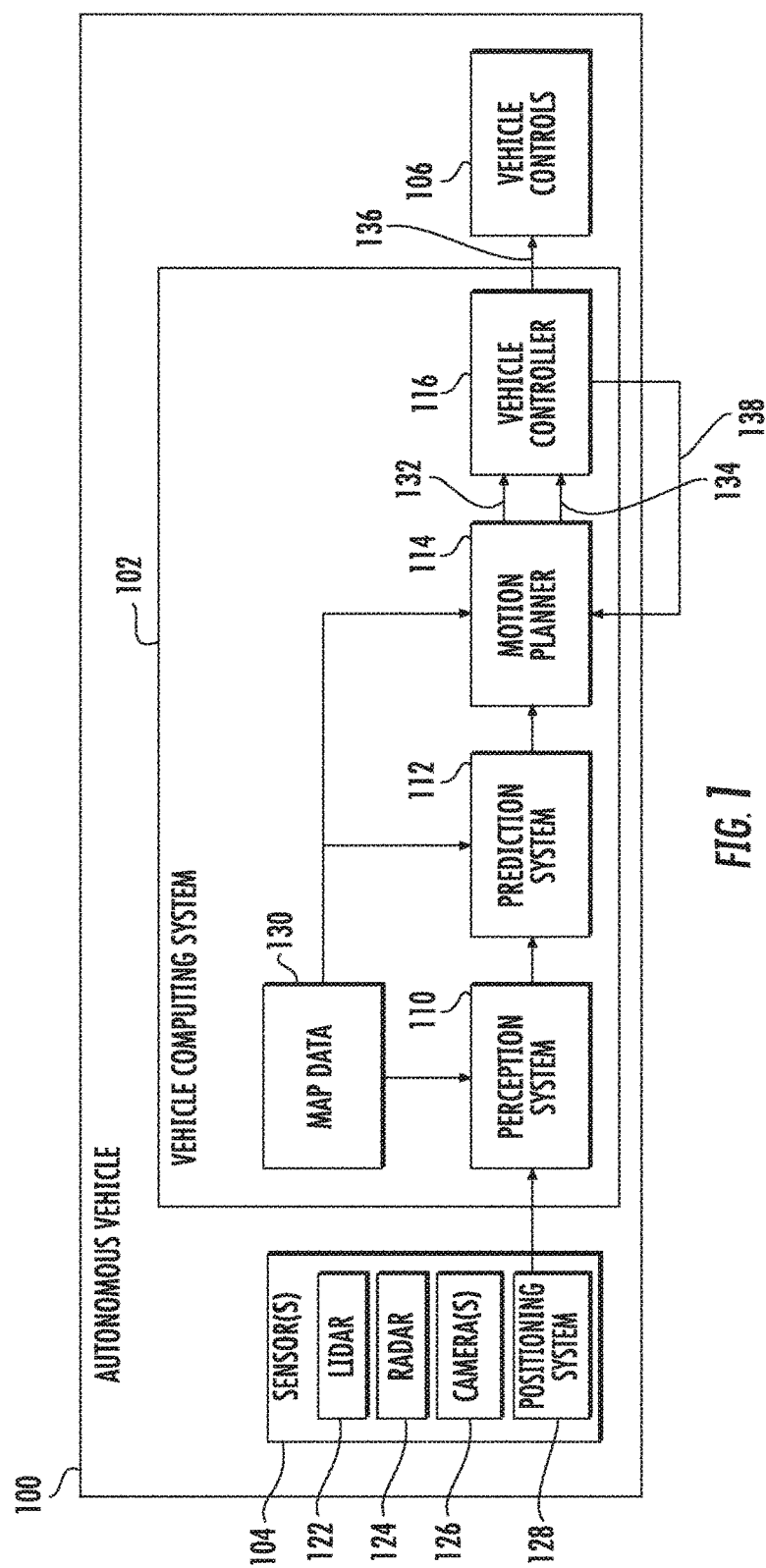
FIG. 1 provides a block diagram of an example autonomous vehicle according to example embodiments of the present disclosure.

Generally, the present disclosure is directed to vehicle controller systems and methods that employ tolerance values defining a level of vehicle control precision for motion control of an autonomous vehicle. More particularly, a vehicle controller can obtain a trajectory that describes a proposed motion path for the autonomous vehicle. A constraint set of one or more tolerance values defining a level of vehicle control precision can be determined or otherwise obtained. For example, tolerance values can include a longitudinal tolerance value defining a level of permitted deviation in the longitudinal direction for the autonomous vehicle with respect to the trajectory and/or a lateral tolerance value defining a level of permitted deviation in the lateral direction for the autonomous vehicle with respect to the trajectory. Motion of the autonomous vehicle can be controlled to follow the trajectory within the one or more tolerance values (e.g., longitudinal tolerance value(s) and/or a lateral tolerance value(s)) identified by the constraint set. By creating a motion control framework for autonomous vehicles that includes an adjustable constraint set of tolerance values, autonomous vehicles can more effectively implement different precision requirements for different driving situations.

More particularly, in some implementations, an autonomous vehicle can include a computing system that includes one or more computing devices that assist in controlling the autonomous vehicle. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the computing system can include a perception system, a prediction system, and a motion planner that cooperate to perceive the dynamic surrounding environment of the autonomous vehicle and determine a trajectory describing a proposed motion path for the autonomous vehicle. The computing system can additionally include a vehicle controller configured to control one or more vehicle controls (e.g., actuators that control gas flow (propulsion), steering, braking, etc.) to execute the motion of the autonomous vehicle to follow the trajectory.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the computing system in comprehending and perceiving its surrounding environment and its relationship thereto.

According to an aspect of the present disclosure, the perception system can identify one or more objects that are proximate to the autonomous vehicle based on sensor data received from the one or more sensors and/or the map data. In particular, in some implementations, the perception system can provide, for each object, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon); class (e.g., vehicle versus pedestrian versus bicycle), and/or other state information.

According to an aspect of the present disclosure, the prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planner.

The motion planner can determine a trajectory descriptive of a proposed motion path for the autonomous vehicle. The trajectory can be determined by the motion planner based at least in part on the state data provided by the perception system and/or the predicted one or more future locations for the objects. Stated differently, given information about the current locations of proximate objects and/or predictions about the future locations of proximate objects, the motion planner can determine a trajectory for the autonomous vehicle that best navigates (e.g., based on one or more cost functions) the vehicle relative to the objects at their current and/or future locations. The motion planner can determine a trajectory that navigates a dynamic environment while avoiding all static and moving objects and while optimizing the planned vehicle motion for physical and comfort limits.

More particularly, in some implementations, a trajectory determined by the motion planner can include a series of desired vehicle states. In some implementations, the series of desired vehicle states are determined as a series of different points in time. The vehicle state can be described, for example, by a plurality of vehicle state parameters. Vehicle state parameters can include, but are not limited to, a desired vehicle position and orientation in the surrounding environment, the vehicle velocity, acceleration, and derivative of acceleration, where velocity and acceleration may refer to both translational and angular axes.

In some implementations, the motion planner can also determine a constraint set of one or more tolerance values defining a level of vehicle control precision. For example, the one or more tolerance values can include a longitudinal tolerance value defining a level of permitted deviation in the longitudinal direction for the autonomous vehicle with respect to the trajectory and/or a lateral tolerance value defining a level of permitted deviation in the lateral direction for the autonomous vehicle with respect to the trajectory.

In some implementations, the one or more tolerance values provided within the constraint set are determined based at least in part on a current context associated with operation of the autonomous vehicle. For example, a current context could provide information descriptive of one or more of the following: an environment in which an autonomous vehicle is currently operating (e.g., an urban street, an interstate, a particular geographic area (e.g., a city, state, or the like), a maneuver in which the autonomous vehicle is currently engaged or about to engage (e.g., driving through an intersection, passing in between two vehicles), information about the current state of the autonomous vehicle, information about the current or predicted future state of vehicles or other objects proximate to the autonomous vehicle), or other suitable information.

By defining tolerance values relative to a current context associated with operation of the autonomous vehicle, different tolerance values can be provided based on different levels of restraint or vehicle control precision needed for safe operation. For instance, a vehicle traveling through an intersection without any oncoming traffic may have different tolerance values than a vehicle traveling through the same intersection while navigating oncoming traffic. Similarly, a vehicle traveling along a multi-lane highway without traffic in adjacent lanes may have different tolerance values than a vehicle traveling along a multi-lane highway with traffic proximate to the vehicle in one or more adjacent lanes.

Tolerance values can be determined from a current context associated with vehicle operation in a variety of manners. For example, a motion planner or other component of an autonomy system can compute tolerance values based on the relative distance of objects from the autonomous vehicle location over time as specified in a trajectory. In other words, the tolerance values can be determined to constrain the autonomous vehicle to remain within a set of all candidate trajectories which respect a minimum distance from objects. In another example, a dedicated context component within an autonomous vehicle (e.g., a context controller within the perception system, prediction system, or motion planner) can generate context information descriptive of a particular subset of information associated with a current context (e.g., an autonomous vehicle is in an intersection according to the vehicle's current location compared to map data, or three objects are located within 20 feet of the autonomous vehicle, or a nearest object to the autonomous vehicle is between X and Y feet away). Predefined tolerance values can be obtained from a look up table or otherwise determined based on the context information generated by the dedicated context component.

According to another aspect of the present disclosure, the trajectory and constraint set can be provided from the motion planner to a vehicle controller. In some implementations, the vehicle controller can be a linear controller that may not have the same level of information about the environment and obstacles around the desired path of movement as is available in other computing system components (e.g., the perception system, prediction system, motion planner, etc.) Nonetheless, the vehicle controller can function to keep the autonomous vehicle reasonably close to the trajectory. A level of vehicle control precision describing exactly how close to the trajectory is required in a given operational context can be defined by the one or more tolerance values in the constraint set.

More particularly, the vehicle controller can be configured to control motion of the autonomous vehicle to follow the trajectory within the one or more tolerance values identified by the constraint set. With respect to longitudinal tolerance value(s) identified by a constraint set, the vehicle controller can control one or more of propulsion and braking of the autonomous vehicle to follow the trajectory within the longitudinal tolerance value(s). With respect to lateral tolerance value(s) identified by a constraint set, the vehicle controller can control steering of the autonomous vehicle to follow the trajectory within the lateral tolerance value.

In some implementations, the vehicle controller can be configured to generate one or more actuator commands (e.g., at least one lateral vehicle actuator command and at least one longitudinal vehicle actuator command) and to further control one or more vehicle actuators in accordance with the actuator command(s). Vehicle actuators can include, for example, a steering actuator, a braking actuator, and/or a propulsion actuator. In some implementations, the vehicle actuators can include further low-level control logic. For example, additional low-level control logic may be beneficial to control a steering motor to keep the steering rack at a desired position as commanded by the vehicle controller in case the vehicle controller does not directly control the steering motor.

In some implementations, the vehicle actuator commands generated by the vehicle controller can be based at least in part on tolerance parameters (e.g., a longitudinal tolerance parameter and a lateral tolerance parameter). The tolerance parameters can be determined by the vehicle controller and based at least in part on the constraint set of tolerance values, the trajectory, the current vehicle state and/or the tracking error. In some implementations, the vehicle actuator commands can be determined based on one or more adjustable parameters, and the tolerance parameters are used to alter the adjustable parameters. For instance, in some implementations, the longitudinal and/or lateral tolerance parameters can be scalar values that can vary within a given range (e.g., a range between 0 and 1). In such examples, the tolerance parameters can be used to implement controller tuning within the vehicle controller in a manner whereby the tolerance parameters can be used to interpolate (e.g., linearly interpolate) between two sets of adjustable parameters (e.g., a set of minimum adjustable parameters and a set of maximum adjustable parameters).

Implementation of the actuator commands by the one or more vehicle actuators can result in forces acting on the autonomous vehicle, which in conjunction with other forces such as aerodynamic drag and friction determine a change of the vehicle state (e.g., change in current velocity, etc.). In some implementations, one or more state variables representing the current state of the autonomous vehicle can be obtained by motion sensors (e.g., an inertial measurement unit (IMU)) or other components within the autonomous vehicle. The one or more state variables can be analyzed relative to a desired trajectory to determine a tracking error descriptive of the deviation of the autonomous vehicle from a desired state associated with the trajectory.

According to another aspect of the present disclosure, in some implementations, the vehicle controller can generate tolerance feedback. The tolerance feedback can be descriptive of a current ability of the vehicle controller to follow the trajectory within the one or more tolerance values identified by the constraint set.

In some implementations, the tolerance feedback can be generated based at least in part on a tracking error check. For example, a current measured tracking error for an autonomous vehicle can be compared with an expected tracking error from expected controller performance data. If the current measured tracking error is significantly different than the expected tracking error from expected controller performance data, then the model based approach to choosing controller gains may be less accurate. In addition, if the current measured tracking error and/or expected tracking error are approaching minimum/maximum limits, then the vehicle controller can no longer guarantee constraint set satisfaction and can indicate as such in the tolerance feedback.

In some implementations, the tolerance feedback can additionally or alternatively be generated based at least in part on an aggressiveness limit check. For example, the tolerance values provided in the constraint set can have a corresponding maximum level (e.g., a predetermined value) of aggressiveness. When this maximum level is reached, and is still not sufficient to achieve constraint set satisfaction, then the vehicle controller can indicate as such in the tolerance feedback.

The systems and methods described herein may provide a number of technical effects and benefits. By including tolerance functionality within a vehicle controller of an autonomy system as described herein, different precision requirements for lateral controls (e.g., steering) and/or longitudinal controls (e.g., propulsion/braking) can be implemented. This tolerance functionality can be provided at least in part by relaying both a trajectory and a constraint set of one or more tolerance values from a motion planner to a vehicle controller. The trajectory can describe a proposed motion path for an autonomous vehicle, while the constraint set of one or more tolerance values can define a level of permitted deviation (e.g., in lateral and/or longitudinal directions) for the autonomous vehicle with respect to the trajectory. This allows the vehicle controller to differentiate between operational contexts when more precise control is required, and where more comfortable control is more appropriate. This enhanced configuration can generally improve the operation of the vehicle controller, thus enhancing the overall motion control of the autonomous vehicle in a smoother and safer fashion.

The disclosed systems and methods can provide an additional technical effect and benefit of improving the effectiveness of a motion planner within an autonomy system of an autonomous vehicle. More particularly, tolerance feedback can be generated (e.g., at the vehicle controller) that is descriptive of a current ability of the vehicle controller to follow a trajectory within one or more tolerance values identified by a constraint set. This tolerance feedback can then be provided to the motion planner. As a result, the motion planning layer can be aware of the vehicle controller's precision capabilities, which will affect the motion planner's confidence to plan a trajectory where high precision is required. This enhanced feedback collaboration among autonomy system components can improve the operation of the motion planner, thus enhancing the general navigational function of the autonomous vehicle.

The disclosed systems and methods can provide an additional technical effect and benefit by affording flexibility and customization within the provided tolerance functionality. It can be challenging to design and tune a vehicle controller in a manner that achieves a good trade-off between the maximum deviation of the vehicle state from a desired trajectory (e.g., tracking error) and passenger comfort, which is influenced by the aggressiveness of applied vehicle commands to reject tracking error. By providing tolerance variability as described herein, the level of precision described by the tolerance values can be customized for different driving situations. For instance, high precision can be maintained for driving situations such as when an autonomous vehicle is maneuvering between multiple objects or through an intersection. Conversely, lower precision can be afforded when operations are less constrained, thereby increasing the level of passenger comfort by making autonomous vehicle performance more natural feeling for human passengers.

The systems and methods described herein may also provide resulting improvements to computing technology. In particular, the present disclosure provides techniques that enable a computing system to perform autonomous vehicle control with maneuvers that were heretofore unobtainable using existing computers or control systems. Thus, the present disclosure improves the operation of an autonomous vehicle computing system and the autonomous vehicle it controls.

With reference now to the Figures, example embodiments of the present disclosure will be discussed in further detail.

FIG. 1 depicts a block diagram of an example autonomous vehicle 100 according to example embodiments of the present disclosure. The autonomous vehicle 100 is capable of sensing its environment and navigating without human input. The autonomous vehicle 100 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 100 includes a vehicle computing system 102, one or more sensors 104, and one or more vehicle controls 106. The vehicle computing system 102 can assist in controlling the autonomous vehicle 100. In particular, the vehicle computing system 102 can receive sensor data from the one or more sensors 104, attempt to comprehend the surrounding environment by performing various processing techniques on data collected by the sensors 104, and generate an appropriate motion path through such surrounding environment. The vehicle computing system 102 can control the one or more vehicle controls 106 to operate the autonomous vehicle 100 according to the motion path.

As illustrated in FIG. 1, the vehicle computing system 102 can include one or more computing devices that assist in controlling the autonomous vehicle 100. Vehicle computing system 102 can include a perception system 110, a prediction system 112, and a motion planner 114 that cooperate to perceive the dynamic surrounding environment of the autonomous vehicle 100 and determine a trajectory describing a proposed motion path for the autonomous vehicle 100. Vehicle computing system 102 can additionally include a vehicle controller 116 configured to control the one or more vehicle controls 106 (e.g., actuators that control gas flow (propulsion), steering, braking, etc.) to execute the motion of the autonomous vehicle 100 to follow the trajectory.

In particular, in some implementations, the perception system 110 can receive sensor data from the one or more sensors 104 that are coupled to or otherwise included within the autonomous vehicle 100. As examples, the one or more sensors 104 can include a Light Detection and Ranging (LIDAR) system 122, a Radio Detection and Ranging (RADAR) system 124, one or more cameras 126 (e.g., visible spectrum cameras, infrared cameras, etc.), and/or other sensors. The sensor data can include information that describes the location of objects within the surrounding environment of the autonomous vehicle 100.

As one example, for LIDAR system 122, the sensor data can include the location (e.g., in three-dimensional space relative to the LIDAR system 122) of a number of points that correspond to objects that have reflected a ranging laser. For example, LIDAR system 122 can measure distances by measuring the Time of Flight (TOF) that it takes a short laser pulse to travel from the sensor to an object and back, calculating the distance from the known speed of light.

As another example, for RADAR system 124, the sensor data can include the location (e.g., in three-dimensional space relative to the RADAR system 124) of a number of points that correspond to objects that have reflected a ranging radio wave. For example, radio waves (e.g., pulsed or continuous) transmitted by the RADAR system 124 can reflect off an object and return to a receiver of the RADAR system 124, giving information about the object's location and speed. Thus, a RADAR system 124 can provide useful information about the current speed of an object.

As yet another example, for one or more cameras 126, various processing techniques (e.g., range imaging techniques such as, for example, structure from motion, structured light, stereo triangulation, and/or other techniques) can be performed to identify the location (e.g., in three-dimensional space relative to the one or more cameras 126) of a number of points that correspond to objects that are depicted in imagery captured by the one or more cameras 126. Other sensor systems can identify the location of points that correspond to objects as well.

As another example, the one or more sensors 104 can include a positioning system 128. The positioning system 128 can determine a current position of the autonomous vehicle 100. The positioning system 128 can be any device or circuitry for analyzing the position of the autonomous vehicle 100. For example, the positioning system 128 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 100 can be used by various systems of the vehicle computing system 102.

Thus, the one or more sensors 104 can be used to collect sensor data that includes information that describes the location (e.g., in three-dimensional space relative to the autonomous vehicle 100) of points that correspond to objects within the surrounding environment of the autonomous vehicle 100.

In addition to the sensor data, the perception system 110, prediction system 112 and/or motion planner 114 can retrieve or otherwise obtain map data 130 that provides detailed information about the surrounding environment of the autonomous vehicle 100. The map data 130 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

In addition, according to an aspect of the present disclosure, the map data 130 can include information that describes a significant number of nominal pathways through the world. As an example, in some instances, nominal pathways can generally correspond to common patterns of vehicle travel along one or more lanes (e.g., lanes on a roadway or other travelway). For example, a nominal pathway through a lane can generally correspond to a center line of such lane.

The perception system 110 can identify one or more objects that are proximate to the autonomous vehicle 100 based on sensor data received from the one or more sensors 104 and/or the map data 130. In particular, in some implementations, the perception system 110 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles) that are proximate to the autonomous vehicle 100 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planner 114 can determine a trajectory 132 descriptive of a proposed motion path for the autonomous vehicle 100. The trajectory 132 can be determined by the motion planner 114 based at least in part on the state data provided by the perception system 110 and/or the predicted one or more future locations for the objects provided by the prediction system 112. Stated differently, given information about the current locations of proximate objects and/or predictions about the future locations of proximate objects, the motion planner 114 can determine a trajectory 132 for the autonomous vehicle 100 that best navigates (e.g., based on one or more cost functions) the autonomous vehicle 100 relative to the objects at their current and/or future locations. The motion planner 114 can determine a trajectory 132 that navigates a dynamic environment while avoiding all static and moving objects and while optimizing the planned vehicle motion for physical and comfort limits.

More particularly, in some implementations, a trajectory 132 determined by the motion planner 114 can include a series of desired vehicle states. In some implementations, the series of desired vehicle states are determined as a series of different points in time. The vehicle state can be described, for example, by a plurality of vehicle state parameters. Vehicle state parameters can include, but are not limited to, a desired vehicle position and orientation in the surrounding environment, the vehicle velocity, acceleration, and derivative of acceleration, where velocity and acceleration may refer to both translational and angular axes.

In some implementations, the motion planner can include an optimization planner that applies an optimization algorithm to an optimization to identify a trajectory 132 that optimizes (e.g., locally optimizes) a total cost associated with the trajectory. A variety of suitable optimization algorithms and formulations of the optimization problem can be applied to find the trajectory 132 which optimizes the cost function associated with the optimization problem.

In some implementations, the motion planner 114 can also determine a constraint set 134 of one or more tolerance values defining a level of vehicle control precision. For example, the one or more tolerance values can include a longitudinal tolerance value defining a level of permitted deviation in the longitudinal direction for the autonomous vehicle 100 with respect to the trajectory 132 and/or a lateral tolerance value defining a level of permitted deviation in the lateral direction for the autonomous vehicle 100 with respect to the trajectory 132.

In some implementations, the one or more tolerance values provided within the constraint set 134 are determined based at least in part on a current context associated with operation of the autonomous vehicle 100. For example, a current context could provide information descriptive of one or more of the following: an environment in which autonomous vehicle 100 is currently operating (e.g., an urban street, an interstate, a particular geographic area (e.g., a city, state, or the like), a maneuver in which the autonomous vehicle 100 is currently engaged or about to engage (e.g., driving through an intersection, passing in between two vehicles), information about the current state of the autonomous vehicle 100, information about the current or predicted future state of vehicles or other objects that are proximate to the autonomous vehicle 100), or other suitable information.

By defining tolerance values relative to a current context associated with operation of the autonomous vehicle 100, different tolerance values within constraint set 134 can be provided based on different levels of restraint or vehicle control precision needed for safe operation of autonomous vehicle 100. For instance, a vehicle traveling through an intersection without any oncoming traffic may have different tolerance values than a vehicle traveling through the same intersection while navigating oncoming traffic. Similarly, a vehicle traveling along a multi-lane highway without traffic in adjacent lanes may have different tolerance values than a vehicle traveling along a multi-lane highway with traffic proximate to the vehicle in one or more adjacent lanes.

Tolerance values within constraint set 134 can be determined from a current context associated with vehicle operation in a variety of manners. For example, a motion planner 114 or other component of vehicle computing system 102 can compute tolerance values based on the relative distance of objects from the location of autonomous vehicle 100 over time as specified in the trajectory 132. In other words, the tolerance values within constraint set 134 can be determined to constrain the autonomous vehicle 100 to remain within a set of candidate trajectories which respect a minimum distance from nearby objects. In another example, a dedicated context component within an autonomous vehicle 100 (e.g., a context controller within the perception system 110, prediction system 112, or motion planner 114) can generate context information descriptive of a particular subset of information associated with a current context (e.g., an autonomous vehicle is in an intersection according to the vehicle's current location compared to map data, or three objects are located within 20 feet of the autonomous vehicle, or a nearest object to the autonomous vehicle is between X and Y feet away). Predefined tolerance values can be obtained from a look up table stored within a memory of vehicle computing system 102 or otherwise determined based on the context information generated by the dedicated context component.

According to another aspect of the present disclosure, the trajectory 132 and constraint set 134 can be provided from the motion planner 114 to a vehicle controller 116. In some implementations, the vehicle controller 116 can be a linear controller that may not have the same level of information about the environment and obstacles around the desired path of movement as is available in other computing system components (e.g., the perception system 110, prediction system 112, motion planner 114, etc.) Nonetheless, the vehicle controller 116 can function to keep the autonomous vehicle 100 reasonably close to the trajectory 132. A level of vehicle control precision describing exactly how close to the trajectory 132 is required in a given operational context can be defined by the one or more tolerance values in the constraint set 134.

More particularly, the vehicle controller 116 can be configured to control motion of the autonomous vehicle 100 to follow the trajectory 132 within the one or more tolerance values identified by the constraint set 134. With respect to longitudinal tolerance value(s) identified by a constraint set 134, the vehicle controller 116 can control one or more of propulsion and braking of the autonomous vehicle to follow the trajectory 132 within the longitudinal tolerance value(s). With respect to lateral tolerance value(s) identified by a constraint set 134, the vehicle controller 116 can control steering of the autonomous vehicle 100 to follow the trajectory 132 within the lateral tolerance value.

In some implementations, the vehicle controller 116 can be configured to generate one or more vehicle actuator commands 136 (e.g., at least one lateral vehicle actuator command and at least one longitudinal vehicle actuator command) and to further control one or more vehicle actuators provided within vehicle controls 106 in accordance with the vehicle actuator command(s) 136. Vehicle actuators within vehicle controls 106 can include, for example, a steering actuator, a braking actuator, and/or a propulsion actuator. In some implementations, the vehicle actuators within vehicle controls 106 can include further low-level control logic. For example, additional low-level control logic may be beneficial to control a steering motor to keep the steering rack at a desired position as commanded by the vehicle controller 116 in case the vehicle controller 116 does not directly control the steering motor.

Implementation of the vehicle actuator commands 136 by the one or more vehicle actuators within vehicle controls 106 can result in forces acting on the autonomous vehicle 100, which in conjunction with other forces such as aerodynamic drag and friction determine a change of the vehicle state (e.g., change in current velocity, etc.). In some implementations, one or more state variables representing the current state of the autonomous vehicle can be obtained by motion sensors (e.g., an inertial measurement unit (IMU)) or other components within the autonomous vehicle 100. The one or more state variables can be used in part by motion planner 114 and/or vehicle controller 116 to determine the constraint set 134 and/or vehicle actuator commands 136 as described herein.

Referring still to FIG. 1, in some implementations, the vehicle controller 116 can generate tolerance feedback 138 that is provided, for example, to motion planner 114. The tolerance feedback 138 can be descriptive of a current ability of the vehicle controller 116 to follow the trajectory 132 within the one or more tolerance values identified by the constraint set 134. More particular details concerning vehicle controller 116 are presented with respect to FIGS. 2 and 3.

Each of the perception system 110, the prediction system 112, the motion planner 114, and the vehicle controller 116 can include computer logic utilized to provide desired functionality. In some implementations, each of the perception system 110, the prediction system 112, the motion planner 114, and the vehicle controller 116 can be implemented in hardware, firmware, and/or software controlling a general purpose processor. For example, in some implementations, each of the perception system 110, the prediction system 112, the motion planner 114, and the vehicle controller 116 includes program files stored on a storage device, loaded into a memory and executed by one or more processors. In other implementations, each of the perception system 110, the prediction system 112, the motion planner 114, and the vehicle controller 116 includes one or more sets of computer-executable instructions that are stored in a tangible computer-readable storage medium such as RAM, hard disk, or optical or magnetic media.

Figure 2:
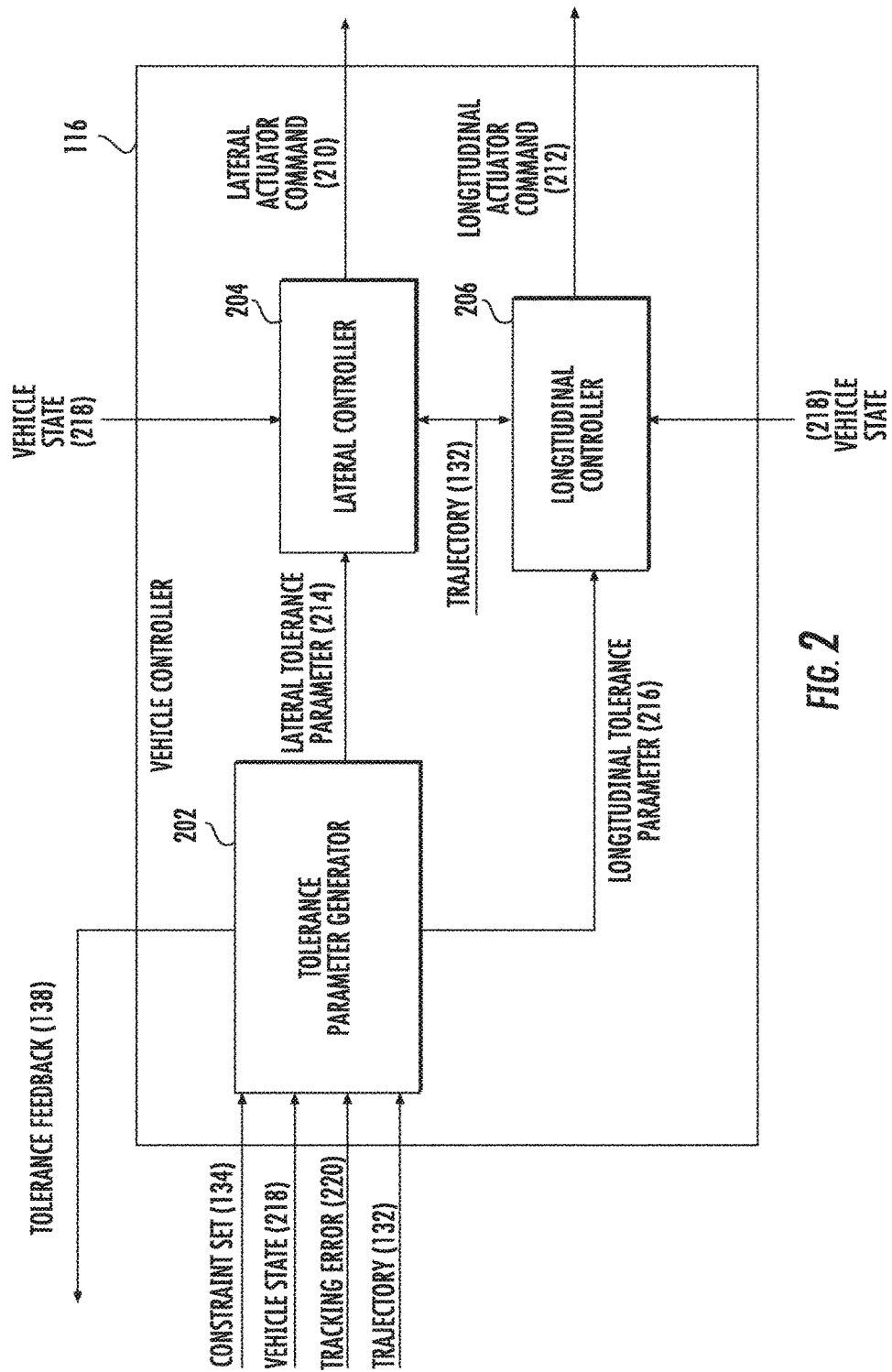
FIG. 2 provides a block diagram of an example vehicle controller according to example embodiments of the present disclosure.

FIG. 2 depicts a block diagram of an example vehicle controller according to example embodiments of the present disclosure. More particularly, an example vehicle controller 116 can include a tolerance parameter generator 202, a lateral controller 204, and a longitudinal controller 206. In some implementations, the vehicle actuator commands (e.g., vehicle actuator commands 136 of FIG. 1) generated by the vehicle controller 116 can include a lateral actuator command 210 and/or a longitudinal actuator command 212. Lateral actuator command 210 can be configured to control a steering actuator that changes lateral motion of an autonomous vehicle. Longitudinal actuator command 212 can be configured to control a braking actuator and/or a propulsion actuator that changes longitudinal motion of an autonomous vehicle. Lateral controller 204 and longitudinal controller 206 can contain the control logic for calculating the deviation of the vehicle with respect to the desired state in context of the corresponding motion to be controlled (longitudinal or lateral).

Vehicle actuator commands (e.g., vehicle actuator commands 136 of FIG. 1 and/or lateral actuator command 210 and longitudinal actuator command 212 of FIG. 2) can be based at least in part on tolerance parameters (e.g., a lateral tolerance parameter 214 and a longitudinal tolerance parameter 216). The tolerance parameters 214, 216 can be determined by the vehicle controller 116 (e.g., by tolerance parameter generator 202) and based at least in part on the constraint set 134 of tolerance values, the trajectory 132, a vehicle state 218 and/or tracking error 220. Vehicle state 218 can correspond, for example, to one or more parameters descriptive of a vehicle's: current location (also referred to as position); current speed (also referred to as velocity); current acceleration, current heading; current orientation; and/or other state information. Tracking error 220 can correspond, for example, to a difference between a current vehicle state (e.g., as determined by one or more measured state variables) and a desired state associated with a trajectory. Tolerance parameter generator 202 can also generate tolerance feedback 138, as discussed in greater detail relative to FIG. 3.

In some implementations, the vehicle actuator commands (e.g., vehicle actuator commands 136 of FIG. 1 and/or lateral actuator command 210 and longitudinal actuator command 212 of FIG. 2) can be determined based on one or more adjustable parameters, and the tolerance parameters (e.g., lateral tolerance parameter 214 and longitudinal tolerance parameter 216) are used to alter the adjustable parameters. For instance, in some implementations, lateral tolerance parameter 214 and longitudinal tolerance parameter 216 can be scalar values that can vary within a given range (e.g., a range between 0 and 1). In such examples, the tolerance parameters 214, 216 can be used to implement controller tuning within the vehicle controller 116 in a manner whereby the tolerance parameters 214, 216 can be used to interpolate (e.g., linearly interpolate) between two sets of adjustable parameters (e.g., a set of minimum adjustable parameters and a set of maximum adjustable parameters).

Each of the tolerance parameter generator 202, lateral controller 204, and longitudinal controller 206 can include computer logic utilized to provide desired functionality. In some implementations, each of the tolerance parameter generator 202, lateral controller 204, and longitudinal controller 206 can be implemented in hardware, firmware, and/or software controlling a general purpose processor. For example, in some implementations, each of the tolerance parameter generator 202, lateral controller 204, and longitudinal controller 206 includes program files stored on a storage device, loaded into a memory and executed by one or more processors. In other implementations, each of the tolerance parameter generator 202, lateral controller 204, and longitudinal controller 206 includes one or more sets of computer-executable instructions that are stored in a tangible computer-readable storage medium such as RAM, hard disk, or optical or magnetic media.

Figure 3:
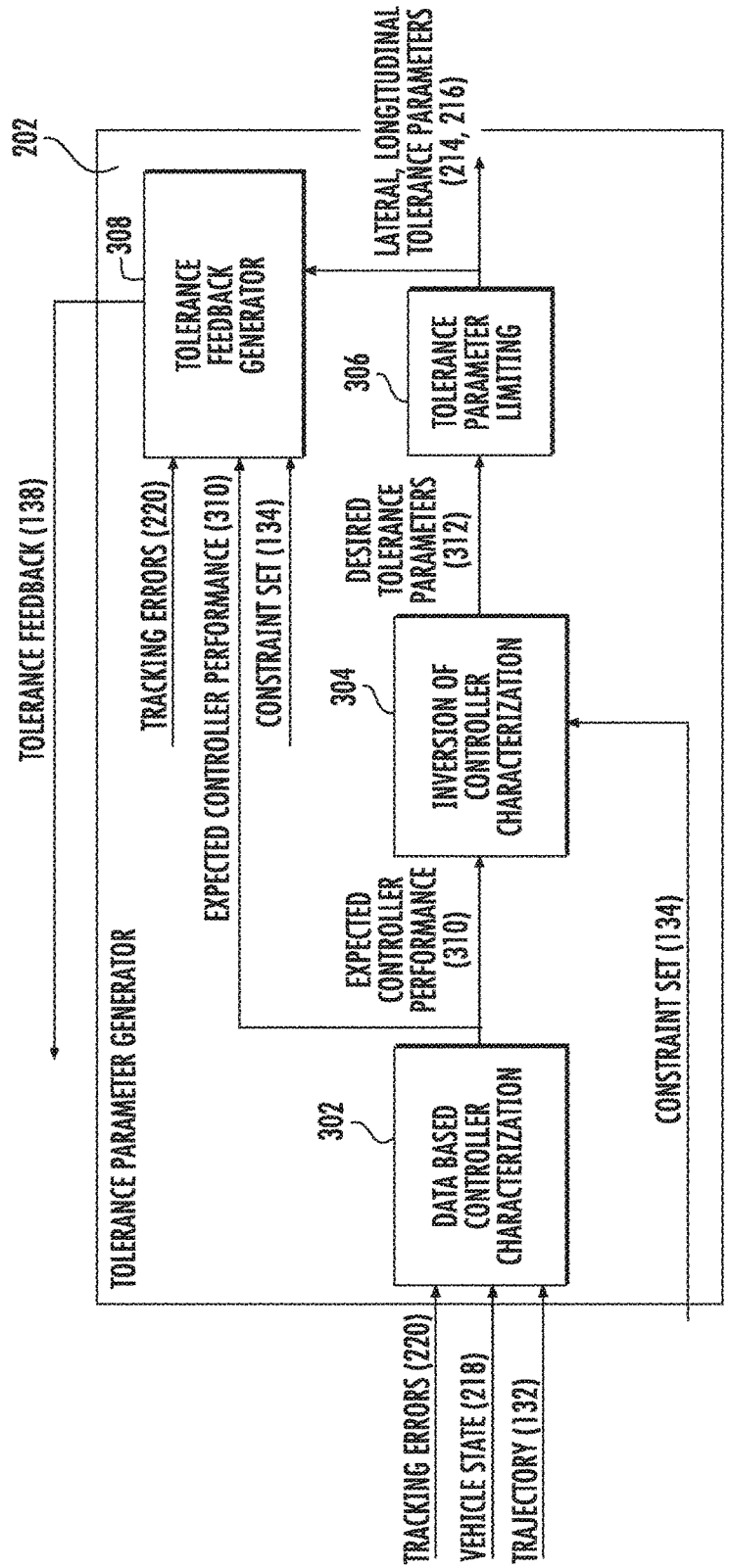
FIG. 3 provides a block diagram of an example tolerance parameter generator according to example embodiments of the present disclosure.

FIG. 3 provides a block diagram of an example tolerance parameter generator according to example embodiments of the present disclosure. More particularly, an example tolerance parameter generator 202 can include a data-based controller characterization system 302, an inversion of controller characterization system 304, a tolerance parameter limiting system 306 and a tolerance feedback generator 308.

In some implementations, the data-based controller characterization system 302 can provide a model configured to receive tracking error 220, vehicle state 218, and trajectory 132. Based at least in part on such variables, data-based controller characterization system 302 can be configured to generate expected controller performance data 310. Expected controller performance data 310 can correspond, for example, to a representation of a threshold amount of deviation (e.g., lateral and/or longitudinal deviation), which according to the controller characterization will not be exceeded. For example, such representation of a threshold amount of deviation can be expressed as a probability of remaining below the threshold amount of deviation given a current and/or desired vehicle state as described by the vehicle state 218 and by the trajectory 132, respectively. In some implementations, the model provided by data-based controller characterization system 302 can be a machine-learned model that is trained using a set of ground truth data that includes training data examples of tracking error 220 and vehicle state 218 matched with corresponding labels of expected controller performance data 310.

In some implementations, the inversion of controller characterization system 304 can be configured to receive the expected controller performance data 310 as well as the constraint set 134 of tolerance values. The inversion of controller characterization system 304 can use the expected controller performance data 310 and the constraint set 134 to output a value of desired tolerance parameters 312. An output value of desired tolerance parameters 312 generated by the inversion of controller characterization system 304 can be generated that would allow the controller precision to be within precision levels (e.g., not to exceed deviation limits) identified by constraint set 134 while also resulting in a determination of tolerance parameters that would allow controller tuning (e.g., tuning of lateral controller 204 and longitudinal controller 206 via lateral tolerance parameter 214 and longitudinal tolerance parameter 216 of FIG. 2) to be as comfortable as acceptable given the current constraint set 134.

In some implementations, the tolerance parameter limiting system 306 can apply limits to the values of the desired tolerance parameters 312 to obtain the lateral and longitudinal tolerance parameters 214, 216. In the example implementation when lateral and longitudinal tolerance parameters are scalar values, the limit applied via tolerance parameter limiting system 306 can be implemented as a clamping operation of the tolerance parameter values to a range of parameters acceptable by the controllers (e.g., lateral controller 204 and longitudinal controller 206 of FIG. 2), namely [0,1]. In some implementations, tolerance parameter limiting system 306 can also implement asymmetric rate limiting to smooth the output of the tolerance parameters, filter out noise in updates to desired tolerance parameters 312, as well as to maintain more aggressive controller settings over one or more predetermined lengths of time.

The tolerance feedback generator 308 can be configured to generate tolerance feedback 138, which can be descriptive of a current ability of the vehicle controller to follow the trajectory 132 within the one or more tolerance values identified by the constraint set 134. In some implementations, the tolerance feedback 138 can be based on the lateral and longitudinal tolerance parameters 214, 216 (as limited by tolerance parameter limiting system 306), expected controller performance data 310, tracking error 220, and constraint set 134.

In some implementations, the tolerance feedback 138 generated by tolerance feedback generator 308 can be generated based at least in part on a tracking error check. For example, a current measured tracking error 220 for an autonomous vehicle can be compared with an expected tracking error from the expected controller performance data 310. If the current measured tracking error 220 is significantly different than the expected tracking error from expected controller performance data 310, then the model based approach to choosing controller gains may be less accurate. In addition, if the current measured tracking error 220 and/or expected tracking error are approaching minimum/maximum limits, then the vehicle controller can no longer guarantee constraint set satisfaction and can indicate as such in the tolerance feedback 138.

In some implementations, the tolerance feedback 138 generated by tolerance feedback generator 308 can additionally or alternatively be generated based at least in part on an aggressiveness limit check. For example, the tolerance values provided in the constraint set 134 can have a corresponding maximum level (e.g., a predetermined value) of aggressiveness. When this maximum level is reached, and is still not sufficient to achieve constraint set satisfaction, then the vehicle controller can indicate as such in the tolerance feedback 138.

Each of the data-based controller characterization system 302, inversion of controller characterization system 304, tolerance parameter limiting system 306 and tolerance feedback generator 308 can include computer logic utilized to provide desired functionality. In some implementations, each of the data-based controller characterization system 302, inversion of controller characterization system 304, tolerance parameter limiting system 306 and tolerance feedback generator 308 can be implemented in hardware, firmware, and/or software controlling a general purpose processor. For example, in some implementations, each of the data-based controller characterization system 302, inversion of controller characterization system 304, tolerance parameter limiting system 306 and tolerance feedback generator 308 can include program files stored on a storage device, loaded into a memory and executed by one or more processors. In other implementations, each of the data-based controller characterization system 302, inversion of controller characterization system 304, tolerance parameter limiting system 306 and tolerance feedback generator 308 includes one or more sets of computer-executable instructions that are stored in a tangible computer-readable storage medium such as RAM hard disk or optical or magnetic media.

FIGS. 4A and 4B depict a first example aspect of a current context associated with operation of an autonomous vehicle according to example embodiments of the present disclosure. More particularly, FIGS. 4A and 4B depict a visual example of an autonomous vehicle navigating along a multi-lane roadway 400 that includes a first lane 402, second lane 404, third lane 406, and fourth lane 408. First lane 402 and second lane 404 are for travel in a first direction, while third lane 406 and fourth lane 408 are for travel in a second direction that is generally opposite the first direction.

In FIG. 4A, autonomous vehicle 410 is currently traveling along a trajectory 412 in the second lane 404. When the current context provides data indicative of the fact that there are no other vehicles or other objects within adjacent travel lanes (e.g., first travel lane 402, third travel lane 406, and/or fourth travel lane 408) or otherwise proximate to autonomous vehicle 410, a constraint set of tolerance values may accommodate more deviation of autonomous vehicle 410 in the lateral direction (e.g., left and right) with respect to trajectory 412. A greater amount of deviation defined by a constraint set of tolerance values may accommodate smoother controls and a greater level of passenger comfort for autonomous vehicle 410 when acceptable given the current context depicted in FIG. 4A.

In FIG. 4B, a permitted amount of deviation in the lateral direction might be quite different than FIG. 4A when autonomous vehicle 410 is traveling along a same trajectory 412 as depicted in FIG. 4A, but within a different current context. For example, a current context depicted in FIG. 4B could be described by data indicative of a first vehicle 414 traveling in first lane 402 and a second vehicle 416 traveling in third lane 406. A current context defined by such data may result in a constraint set of tolerance values that requires a much smaller level of permitted deviation for autonomous vehicle 410 in the lateral direction (e.g., left and right) with respect to trajectory 412. Although a smaller level of permitted deviation in the lateral direction may temporarily result in tighter controls, autonomous vehicle 410 can better ensure safe navigation along trajectory 412 between first and second vehicles 414 and 416.

FIGS. 5A and 5B depict a second example aspect of a current context associated with operation of an autonomous vehicle according to example embodiments of the present disclosure. More particularly, FIGS. 5A and 5B depict a visual example of an intersection 500 that includes a first lane 502, second lane 504, third lane 506, and fourth lane 508. First lane 502 is for travel in a first direction, while second lane 504 is for travel in a second direction that is generally opposite the first direction. Third lane 506 is for travel in a third direction, while fourth lane 508 is for travel in a fourth direction that is generally opposite the third direction. In the particular example of FIGS. 5A and 5B, the first and second directions of first and second lanes 502, 504 are generally perpendicular to the third and fourth directions of third and fourth lanes 506, 508.

In FIG. 5A, autonomous vehicle 510 is currently traveling along a trajectory 512 in the first lane 502 through intersection 500. When the current context provides data indicative of the fact that there are no other vehicles or other objects within intersection 500 or otherwise proximate to autonomous vehicle 510, a constraint set of tolerance values may accommodate more deviation of autonomous vehicle 510 in the longitudinal direction (e.g., front and back) with respect to trajectory 512. A greater amount of deviation (e.g., slowing down or speeding up through intersection 500) defined by a constraint set of tolerance values may accommodate smoother controls and a greater level of passenger comfort for autonomous vehicle 510 when acceptable given the current context depicted in FIG. 5A.

In FIG. 5B, a permitted amount of deviation in the longitudinal direction might be quite different than in FIG. 5A when autonomous vehicle 510 is traveling along a same trajectory 512 as depicted in FIG. 5A, but within a different current context. For example, a current context depicted in FIG. 5B could be described by data indicative of a vehicle 514 traveling in third lane 506 through intersection 500 at a time and/or location that is close to that associated with trajectory 512 for navigation of autonomous vehicle 510 through intersection 500. A current context defined by such data may result in a constraint set of tolerance values that requires a much smaller level of permitted deviation for autonomous vehicle 510 in the longitudinal direction with respect to trajectory 512. Although a smaller level of permitted deviation in the longitudinal direction may temporarily result in tighter controls, autonomous vehicle 510 can better ensure safe navigation along trajectory 512 relative to vehicle 514, for example, by making sure that autonomous vehicle 510 does not slow down significantly while traveling through intersection 500 so that autonomous vehicle 510 can navigate through intersection 500 before vehicle 514 does.

Figure 6:
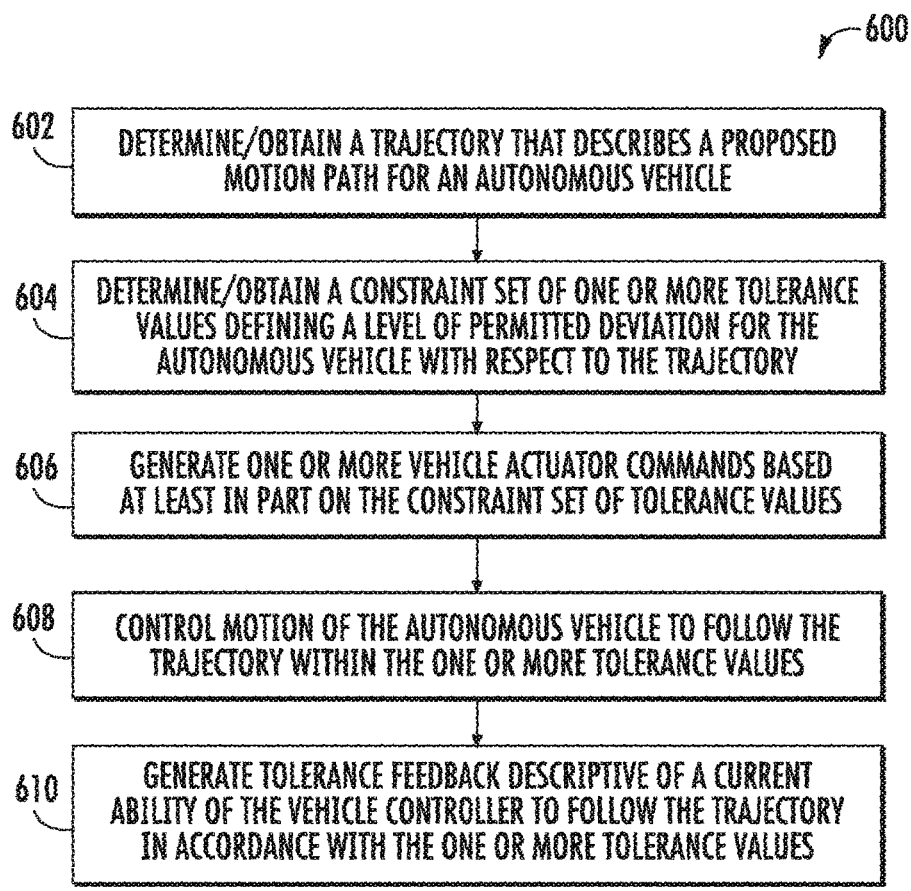
FIG. 6 provides a flowchart diagram of a method to control motion of an autonomous vehicle according to example aspects of the present disclosure.

FIG. 6 provides a flowchart diagram of a method 600 to control motion of an autonomous vehicle according to example aspects of the present disclosure. One or more portion(s) of the method 600 can be implemented by one or more computing systems or devices such as, for example, vehicle computing system 102 of FIG. 1 or computing systems 810 and/or 830 of FIG. 8.

At 602, one or more computing devices within a computing system can determine or otherwise obtain a trajectory that describes a proposed motion path for an autonomous vehicle. In some implementations, the trajectory is determined by a motion planner and relayed to a vehicle controller. For example, FIG. 1 describes how trajectory 132 is determined by motion planner 114 and obtained by vehicle controller 116.

At 604, one or more computing devices within a computing system can determine or otherwise obtain a constraint set of one or more tolerance values defining a level of permitted deviation for the autonomous vehicle with respect to the trajectory determined/obtained at 602. In some implementations, the one or more tolerance values determined/obtained at 604 can include a longitudinal tolerance value defining a level of permitted deviation in the longitudinal direction for the autonomous vehicle with respect to the trajectory determined/obtained at 602 and/or a lateral tolerance value defining a level of permitted deviation in the lateral direction for the autonomous vehicle with respect to the trajectory determined/obtained at 602. In some implementations, the constraint set of tolerance value(s) is determined by a motion planner and relayed to a vehicle controller. For example, FIG. 1 describes how constraint set 134 is determined by motion planner 114 and subsequently obtained by vehicle controller 116.

More particularly, in some implementations, the constraint set of tolerance values determined/obtained at 604 can be determined based on a current context associated with operation of the autonomous vehicle. For example, the current context can provide information descriptive of one or more of: an environment in which the autonomous vehicle is currently operating, a maneuver in which the autonomous vehicle is currently engaged or about to engage, a current state of the autonomous vehicle, or a current or predicted future state of objects proximate to the autonomous vehicle. In some implementations, the constraint set of one or more tolerance values determined/obtained at 604 can be determined based on a relative distance of objects from a location of the autonomous vehicle over time as specified in the trajectory. In some implementations, the constraint set of one or more tolerance values determined/obtained at 604 can be determined by obtaining predefined tolerance values from a look up table based on current context information generated by a dedicated context controller provided within the autonomous vehicle.

At 606, one or more computing devices within a computing system can generate one or more vehicle actuator commands based at least in part on the constraint set of tolerance values determined/obtained at 604. For example, vehicle actuator commands generated at 606 can include a longitudinal actuator command for controlling a propulsion actuator and/or braking actuator within an autonomous vehicle. Vehicle actuator commands generated at 606 can also include a lateral actuator command for controlling a steering actuator within an autonomous vehicle. In some implementations, the one or more vehicle actuator commands generated at 606 can be determined based on one or more adjustable parameters. Tolerance parameters can be generated as more particularly described in FIG. 7 and used to alter the adjustable parameters associated with the vehicle actuator commands.

At 608, one or more computing devices within a computing system can control motion of the autonomous vehicle in accordance with the vehicle actuator command(s) generated at 606 such that the autonomous vehicle follows the trajectory determined/obtained at 602 in accordance with the one or more tolerance values determined/obtained at 604.

At 610, one or more computing devices within a computing system can generate tolerance feedback descriptive of a current ability of a vehicle controller to follow the trajectory determined/obtained at 602 in accordance with the one or more tolerance values in the constraint set determined/obtained at 604. In some implementations, the tolerance feedback can be generated at 610 at least in part from a tracking error check that compares a current measured tracking error for the autonomous vehicle with an expected tracking error. In some implementations, the tolerance feedback can be generated at 610 at least in part from an aggressiveness limit check that compares the one or more tolerance values to one or more predetermined limit values.

Figure 7:
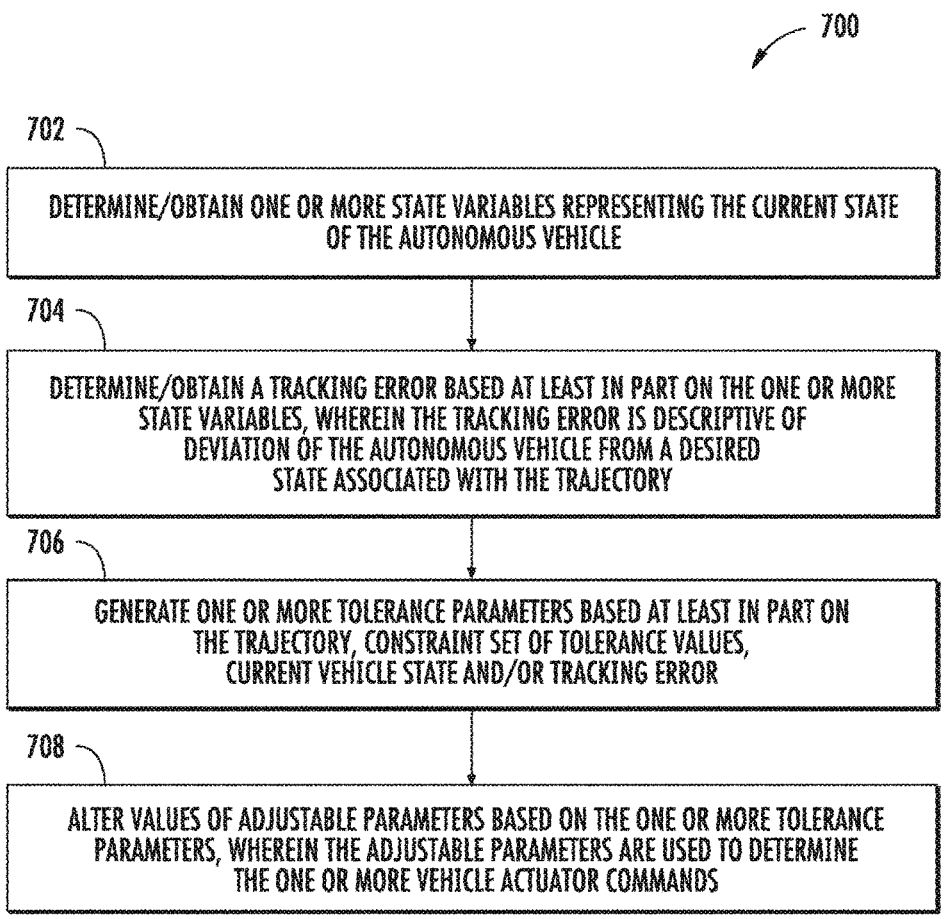
FIG. 7 provides a flowchart diagram of a method for generating vehicle actuator commands according to example aspects of the present disclosure.

FIG. 7 provides a flowchart diagram of a method for generating vehicle actuator commands according to example aspects of the present disclosure. One or more portion(s) of the method 700 can be implemented by one or more computing systems or devices such as, for example, vehicle computing system 102 of FIG. 1 or computing systems 810 and/or 830 of FIG. 8. More particular aspects associated with generation of such vehicle actuator commands can also be appreciated with respect to FIGS. 2 and 3.

At 702, one or more computing devices within a computing system can determine or otherwise obtain one or more state variables representing the current state of the autonomous vehicle. The state variables determined/obtained at 702 can be obtained, for example, by an inertial measurement unit (IMU) or other motion sensors provided within the autonomous vehicle.

At 704, one or more computing devices within a computing system can determine or otherwise obtain a tracking error based at least in part on the one or more state variables determined/obtained at 702. The tracking error determined/obtained at 704 can be descriptive of deviation of the autonomous vehicle from a desired state associated with the current trajectory (e.g., the trajectory determined/obtained at 602 of FIG. 6).

At 706, one or more computing devices within a computing system can generate one or more tolerance parameters based at least in part on the trajectory, constraint set of tolerance values, current vehicle state and/or tracking error. In some implementations, the one or more tolerance parameters generated at 706 can include a longitudinal tolerance parameter and/or a lateral tolerance parameter. The tolerance parameters generated at 706 can sometimes be scalar values that can vary within a given range (e.g., a range between 0 and 1).

At 708, one or more computing devices within a computing system can alter values of adjustable parameters used to determine or that are otherwise associated with one or more vehicle actuator commands (e.g., the vehicle actuator commands generated at 606 in FIG. 6) based on the one or more tolerance parameters generated at 706. The tolerance parameters generated at 706 can thus be used to implement controller tuning at 708 in a manner whereby the tolerance parameters generated at 706 are used to interpolate between two sets of adjustable parameters (e.g., a set of minimum adjustable parameters and a set of maximum adjustable parameters).

Although FIGS. 6 and 7 respectively depict steps performed in a particular order for purposes of illustration and discussion, the methods of the present disclosure are not limited to the particularly illustrated order or arrangement. The various steps of the methods 600 and 700 can be omitted, rearranged, combined, and/or adapted in various ways without deviating from the scope of the present disclosure.

Figure 8:
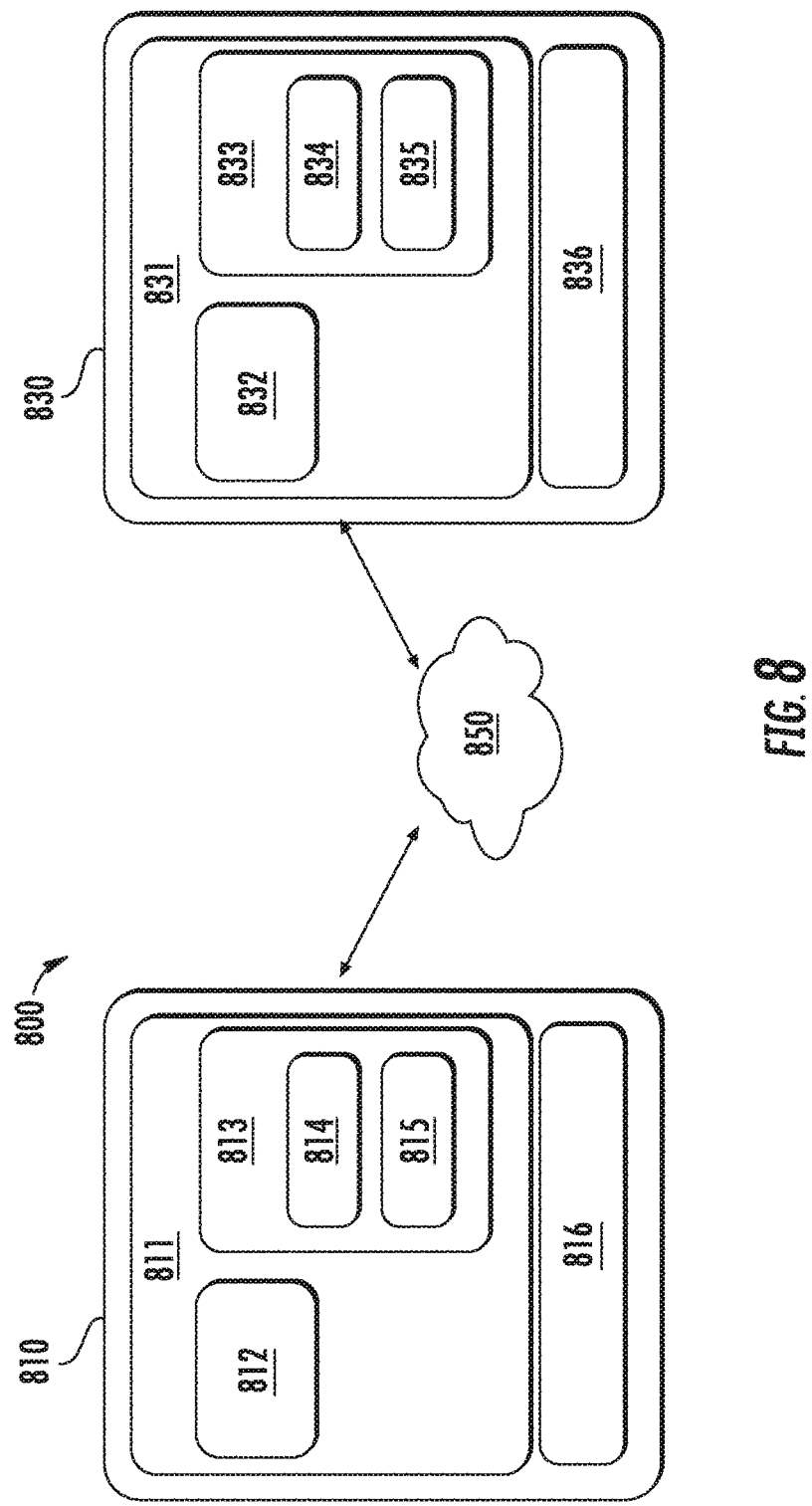
FIG. 8 provides a block diagram of example system components according to example embodiments of the present disclosure.

FIG. 8 provides a block diagram of example system components according to example embodiments of the present disclosure. More particularly, FIG. 8 provides a block diagram of an example computing system 800 according to example embodiments of the present disclosure. Computing system 800 can include a vehicle computing system 810 associated with an autonomous vehicle and a remote computing system 830. The vehicle computing system 810 and remote computing system 830 can be communicatively coupled over a network 850.

The vehicle computing system 810 associated with an autonomous vehicle can correspond in some examples to vehicle computing system 102 associated with autonomous vehicle 100 as described with reference to FIG. 1. Vehicle computing system 810 can include one or more distinct physical computing devices 811 that respectively include one or more processors 812 and at least one memory 813. The one or more processors 812 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 813 can include one or more non-transitory computer-readable storage mediums, such as RAM, ROM, EEPROM, EPROM, flash memory devices, magnetic disks, etc., and combinations thereof. The memory 813 can store data 814 and instructions 815 which are executed by the processor 812 to cause vehicle computing system 810 to perform operations. The instructions 815 can be software written in any suitable programming language or can be implemented in hardware. Additionally, or alternatively, the instructions 815 can be executed in logically and/or virtually separate threads on processor(s) 812. For example, the memory 813 can store instructions 815 that when executed by the one or more processors 812 cause the one or more processors 812 to perform any of the operations and/or functions described herein, including, for example, operations 602-610 of FIG. 6 and/or operations 702-708 of FIG. 7. Vehicle computing system 810 can also include a network interface 816 used to communicate with one or more systems or devices, including systems or devices that are remotely located from the vehicle computing system 810. The network interface 816 can include any circuits, components, software, etc. for communicating with one or more networks (e.g., network 850). In some implementations, the network interface 816 can include, for example, one or more of a communications controller, receiver, transceiver, transmitter, port, conductors, software, and/or hardware for communicating data.

The remote computing system 830 can correspond to an operations computing system associated with an entity (e.g., a service provider) that provides one or more vehicle service(s) to a plurality of users via a fleet of vehicles that includes, for example, the autonomous vehicle 100 of FIG. 1. The vehicle service(s) can include transportation services (e.g., rideshare services), courier services, delivery services, and/or other types of services. The vehicle service(s) can transport and/or deliver passengers as well as items such as but not limited to food, animals, freight, purchased goods, etc. Remote computing system 830 can include one or more distinct physical computing devices 831 that respectively include one or more processors 832 and at least one memory 833. The one or more processors 832 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 833 can include one or more non-transitory computer-readable storage mediums, such as RAM, ROM, EEPROM, EPROM, flash memory devices, magnetic disks, etc., and combinations thereof. The memory 833 can store data 834 and instructions 835 which are executed by the processor 832 to cause operations computing system 830 to perform operations. The instructions 835 can be software written in any suitable programming language or can be implemented in hardware. Additionally, or alternatively, the instructions 835 can be executed in logically and/or virtually separate threads on processor(s) 832. For example, the memory 833 can store instructions 835 that when executed by the one or more processors 832 cause the one or more processors 832 to perform any of the operations and/or functions described herein, for example, one or more of operations 602-610 of FIG. 6 and/or operations 702-708 of FIG. 7. Operations computing system 830 can also include a network interface 836 used to communicate with one or more systems or devices, including systems or devices that are remotely located from the remote computing system 830. The network interface 836 can include any circuits, components, software, etc. for communicating with one or more networks (e.g., network 850). In some implementations, the network interface 836 can include, for example, one or more of a communications controller, receiver, transceiver, transmitter, port, conductors, software, and/or hardware for communicating data.

The network(s) 850 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 850 can be accomplished, for instance, via a network interface using any type of protocol, protection scheme, encoding, format, packaging, etc.

FIG. 8 illustrates one example system 800 that can be used to implement the present disclosure. Other computing systems can be used as well. In addition, components illustrated and/or discussed as being included in one of the computing systems 810 and/or 830 can instead be included in another of the computing systems 810 and/or 830. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A vehicle controller, comprising circuitry configured to:
   obtain a trajectory that describes a proposed motion path for an autonomous vehicle;
   obtain one or more tolerance values defining a level of permitted deviation for the autonomous vehicle with respect to the trajectory, wherein the one or more tolerance values are determined based on a current context associated with operation of the autonomous vehicle; and
   generate one or more vehicle actuator commands based at least in part on the one or more tolerance values, wherein the one or more vehicle actuator commands are configured to control motion of the autonomous vehicle to follow the trajectory within the one or more tolerance values.

2. The vehicle controller of claim 1, wherein the one or more tolerance values comprise a longitudinal tolerance value defining a level of permitted deviation in a longitudinal direction for the autonomous vehicle with respect to the trajectory and a lateral tolerance value defining a level of permitted deviation in the lateral direction for the autonomous vehicle with respect to the trajectory.

3. The vehicle controller of claim 1, wherein the current context provides information descriptive of one or more of: an environment in which the autonomous vehicle is currently operating, a maneuver in which the autonomous vehicle is currently engaged or about to engage, a current state of the autonomous vehicle, or a current or predicted future state of objects proximate to the autonomous vehicle.

4. The vehicle controller of claim 1, wherein the circuitry is further configured to generate tolerance feedback descriptive of a current ability of the vehicle controller to follow the trajectory in accordance with the one or more tolerance values.

5. The vehicle controller of claim 4, wherein the tolerance feedback is generated at least in part from a tracking error check that compares a current measured tracking error for the autonomous vehicle with an expected tracking error.

6. The vehicle controller of claim 4, wherein the tolerance feedback is generated at least in part from an aggressiveness limit check that compares the one or more tolerance values to one or more predetermined limit values.

7. The vehicle controller of claim 1, wherein:
   the one or more vehicle actuator commands are determined based on one or more adjustable parameters; and
   the circuitry is further configured to generate one or more tolerance parameters that are used to alter the one or more adjustable parameters.

8. The vehicle controller of claim 1, wherein:
   the circuitry is further configured to generate expected controller performance data that describes a threshold amount of deviation that will not be exceeded; and
   the one or more tolerance parameters are generated based at least in part on the expected controller performance data.

9. The vehicle controller of claim 1, wherein the circuitry is further configured to apply tolerance parameter limiting to the one or more tolerance parameters to smooth the output of the one or more tolerance parameters.

10. An autonomous vehicle, comprising:
    a computing system comprising one or more computing devices;
    a vehicle controller implemented by the computing system, the vehicle controller configured to:
    obtain a trajectory that describes a proposed motion path for the autonomous vehicle and a constraint set of one or more tolerance values defining a level of vehicle control precision; and
    generate a longitudinal actuator command and a lateral actuator command based at least in part on the constraint set of the one or more tolerance values; and
    one or more actuators configured to receive the longitudinal actuator command and the lateral actuator command and control motion of the autonomous vehicle to follow the trajectory in accordance with the level of vehicle control precision defined by the constraint set of the one or more tolerance values.

11. The autonomous vehicle of claim 10, further comprising a motion planner implemented by the computing system, wherein the motion planner is configured to generate the trajectory that describes the proposed motion path for the autonomous vehicle, and wherein the motion planner is configured to generate the constraint set of the one or more tolerance values.

12. The autonomous vehicle of claim 11, wherein the motion planner is configured to generate the constraint set of the one or more tolerance values based on a relative distance of objects from a location of the autonomous vehicle over time as specified in the trajectory.

13. The autonomous vehicle of claim 11, wherein the motion planner is configured to generate the constraint set of the one or more tolerance values by obtaining predefined tolerance values from a look up table based on context information generated by a dedicated context controller provided within the autonomous vehicle.

14. The autonomous vehicle of claim 10, wherein the vehicle controller is further configured to determine tolerance feedback descriptive of a current ability of the vehicle controller to follow the trajectory within the one or more tolerance values and to provide the tolerance feedback to the motion planner.

15. The autonomous vehicle of claim 10, wherein:
the at least one lateral vehicle actuator command and the at least one longitudinal vehicle actuator command are respectively determined based on one or more adjustable parameters; and
the vehicle controller is further configured to generate a longitudinal tolerance parameter and a lateral tolerance parameter that are used to alter the values of the one or more adjustable parameters used to determine the at least one lateral vehicle actuator command and the at least one longitudinal vehicle actuator command.

16. The autonomous vehicle of claim 10, wherein the vehicle controller comprises a tolerance parameter generator configured to generate one or more tolerance parameters that are used at least in part to generate the longitudinal actuator command and the lateral actuator command, the tolerance parameter generator comprising:
a data-based controller characterization system configured to generate expected controller performance data that describes a threshold amount of deviation that will not be exceeded; and
an inversion of controller characterization system that receives the expected controller performance data and generate the one or more tolerance parameters based at least in part on the expected controller performance data.

17. The autonomous vehicle of claim 16, wherein the tolerance parameter generator further comprises a tolerance parameter limiting system that implements asymmetric rate limiting to smooth the output of the one or more tolerance parameters.

18. A computer-implemented method to control motion of an autonomous vehicle, the method comprising:
obtaining, by a computing system comprising one or more computing devices, a trajectory that describes a proposed motion path for the autonomous vehicle;
obtaining, by the computing system, a constraint set of one or more tolerance values defining a level of vehicle control precision;
generating, by the computing system, one or more vehicle actuator commands based at least in part on the one or more tolerance values of the constraint set; and
controlling motion of the autonomous vehicle in accordance with the one or more vehicle actuator commands such that the autonomous vehicle follows the trajectory within the one or more tolerance values identified by the constraint set.

19. The computer-implemented method of claim 18, further comprising:
obtaining, by the computing system, one or more state variables representing the current state of the autonomous vehicle; and
determining, by the computing system, based at least in part on the one or more state variables and the trajectory, a tracking error descriptive of a deviation of the autonomous vehicle from a desired state associated with the trajectory; and
wherein the constraint set of the one or more tolerance values defining a level of vehicle control precision is determined at least in part from the one or more state variables and the tracking error.

20. The computer-implemented method of claim 18, wherein:
the one or more tolerance values comprise a longitudinal tolerance value defining a level of permitted deviation in a longitudinal direction for the autonomous vehicle with respect to the trajectory and a lateral tolerance value defining a level of permitted deviation in the lateral direction for the autonomous vehicle with respect to the trajectory; and
the one or more vehicle actuator commands comprise a longitudinal actuator command for controlling the autonomous vehicle to follow the trajectory within the longitudinal tolerance value and a lateral actuator command for controlling the autonomous vehicle to follow the trajectory within the lateral tolerance value.

* * * * *